(12) United States Patent
Grosskopf et al.

(10) Patent No.: US 10,183,239 B2
(45) Date of Patent: Jan. 22, 2019

(54) DEAERATOR SHAFT WITH ATTACHMENT SURFACES

(71) Applicant: HAMILTON SUNDSTRAND CORPORATION, Charlotte, NC (US)

(72) Inventors: Andrew P. Grosskopf, Rockford, IL (US); Aaron M. Finke, Janesville, WI (US); Christine Lynn Ooyen, Winnebago, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 302 days.

(21) Appl. No.: 14/663,246

(22) Filed: Mar. 19, 2015

(65) Prior Publication Data

US 2016/0271525 A1    Sep. 22, 2016

(51) Int. Cl.
*B01D 19/00* (2006.01)
*F02C 7/32* (2006.01)
*F02C 7/36* (2006.01)
*H02K 7/116* (2006.01)
*H02K 7/18* (2006.01)

(52) U.S. Cl.
CPC ............ *B01D 19/0042* (2013.01); *F02C 7/32* (2013.01); *F02C 7/36* (2013.01); *H02K 7/116* (2013.01); *H02K 7/1823* (2013.01); *F05D 2240/61* (2013.01); *F05D 2260/608* (2013.01)

(58) Field of Classification Search
CPC . B01D 19/0042; B01D 19/00–19/0495; F02C 7/32; F02C 7/36; H02K 7/1823; H02K 7/116; F05D 2240/61; F05D 2240/608; F05D 2260/608

USPC ...................... 96/220, 204–217; 95/260–262
See application file for complete search history.

(56) References Cited

U.S. PATENT DOCUMENTS

2010/0074766 A1    3/2010   Lee
2011/0303090 A1*  12/2011   Wolz ................. B01D 17/0211
                                                    95/248

FOREIGN PATENT DOCUMENTS

EP    1310675 A2     5/2003
WO    8603422        6/1986
WO    2007021095 A1  2/2007

OTHER PUBLICATIONS

European Search Report Issued in EP Application No. 16161189.2, dated Aug. 18, 2016, 8 Pages.

* cited by examiner

*Primary Examiner* — T. Bennett McKenzie
(74) *Attorney, Agent, or Firm* — Cantor Colburn LLP

(57) ABSTRACT

A deaerator shaft may have a tubular intake segment that forms an intake end of the deaerator shaft, a tubular sleeve attachment segment that is adjacent to the intake segment, a tubular central segment that is adjacent to the sleeve attachment segment, the central segment having a third diameter that is greater than the second diameter, the central segment comprising a protruding ring that radially extends from the central segment and divides the central segment, the protruding ring having opposing flat surfaces, and a tubular discharge segment that forms a discharge end of the deaerator shaft. A gear may have a central ring positioned along an axis, opposing tabs that extend from a first axial side of the central ring, and a shouldered ring that extends from a second axial side of the central ring, the shouldered ring having a lip that extends radially inward toward the axis.

9 Claims, 9 Drawing Sheets

DEAERATOR SHAFT WITH ATTACHMENT SURFACES

FIELD OF THE INVENTION

The subject matter disclosed herein relates to aircraft power systems, and in particular to a deaerator shaft and gear for use within an IDG.

BACKGROUND

In a conventional integrated drive generator (IDG) system, an input shaft connectable to a gearbox driven by an aircraft engine is connected to a mechanical differential, the differential having an output connected to drive a generator. A variable speed transmission, such as a hydromechanical transmission, is associated with the mechanical differential and controlled to modify the output of the differential, as required, whereby the input speed to the generator remains constant even though the speed of the input shaft may vary.

Such systems require oil and, accordingly, IDG's may include a deaerator system to separate oil from an air/oil mixture. Deaerator systems may include a centrifuge device mounted to a rotating shaft that separates the oil from the air/oil mixture. The centrifuge mounted to a shaft will make up the deaerator. In addition, the deaerator could be used to mount other rotating components such as a gear or Permanent Magnet Generator (PMG).

BRIEF DESCRIPTION OF THE INVENTION

In one aspect, a deaerator shaft has a plurality of segments of varying diameter. The plurality of segments may include a tubular intake segment, a tubular sleeve attachment segment, a tubular central segment and a tubular discharge segment. The intake segment forms an intake end of the deaerator shaft, the intake segment is configured to receive fluid, the intake segment having a first diameter. A tubular sleeve attachment segment is adjacent to the intake segment, the sleeve attachment segment may have a second diameter that is greater than the first diameter. A tubular central segment is adjacent to the sleeve attachment segment, the central segment having a third diameter that is greater than the second diameter, the central segment comprising a protruding ring that radially extends from the central segment and divides the central segment, the protruding ring having opposing flat surfaces. A tubular discharge segment that forms a discharge end of the deaerator shaft, the tubular discharge segment is adjacent to the central segment, the discharge segment having a fourth diameter that is equal to the first diameter.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
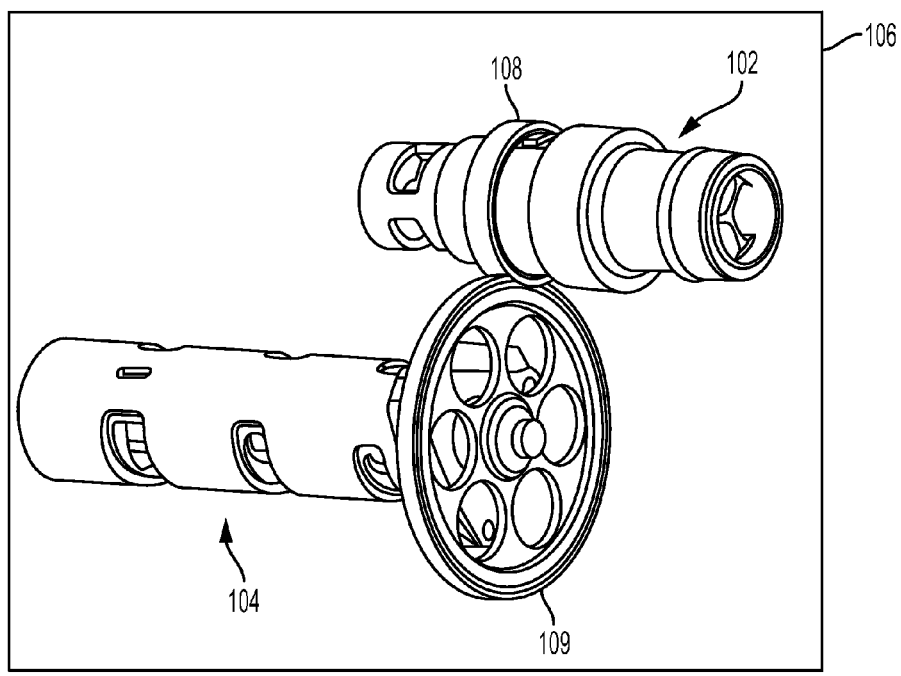
FIG. 1 is an illustration of an deaerator assembly and a pump assembly within a housing of an IDG in accordance with one embodiment of the invention.

FIG. 1 illustrates a view of a deaerator shaft 102 and pump assembly 104 within an integrated drive generator (IDG) housing 106 in accordance with one embodiment of the invention. The IDG may include the deaerator shaft 102, a deaerator drive gear 108, the pump assembly 104, and pump drive gear 109. In operation, the pump assembly 104 is driven by the pump drive gear 109. The pump drive gear 109 may be mated with a deaerator drive gear 108 surrounding the deaerator shaft 102. As the pump drive gear 109 turns, the deaerator shaft 102 may rotate. Fluid flowing into the deaerator shaft 102 may be centrifuged, causing a supply of oil to be transferred and siphoned by the pump assembly 104. In operation, a sufficient amount of oil is processed and flows through the deaerator shaft 102 so that the pump assembly 104 (in particular a charge pump component of the pump assembly) may be provided with a full supply of oil. A sufficient amount of oil may be supplied to components of the IDG for cooling and lubrication purposes by the charge pump component.

Figure 2:
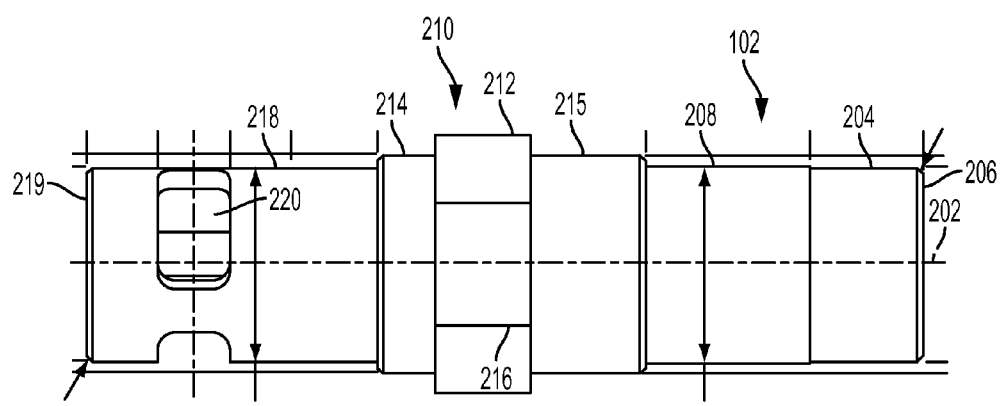
FIG. 2 is an illustration of an deaerator shaft in accordance with one embodiment of the invention.

FIG. 2 illustrates the deaerator shaft 102 in more detail. The deaerator shaft 102 comprises a plurality of tubular segments that may extend axially along an axis 202. The axis 202 may extend the length of the deaerator shaft 102.

A tubular intake segment 204 is disposed along the axis 202, forming an intake end 206 of the deaerator shaft 102. The tubular intake segment 204 is configured to receive fluid and has a diameter of approximately 1.175 in. (2.9845 cm). The tubular intake segment 204 has a length of approximately 0.684 in. (1.737 cm) extending along the axis 202. The end of the tubular intake segment 206 that forms the intake end 206 is chamfered in one embodiment. The chamfered edge can form a 45 degree angle with respect to an outer wall of the tubular intake segment 204.

The deaerator shaft 102 further comprises a tubular sleeve attachment segment 208 that is adjacent to the tubular intake segment 204. The tubular sleeve attachment segment 208 extends along the axis 202 and has a diameter that is greater than the diameter of the tubular intake segment. In one embodiment, the diameter of the tubular sleeve attachment segment 208 is approximately 1.195 in. (3.0353 cm). The tubular sleeve attachment segment 208 has a length of approximately 0.684 in. (1.737 cm) extending along the axis 202.

The deaerator shaft 102 further comprises a central segment 210 extending along the axis 202. The central segment 210 may be adjacent to the tubular sleeve attachment segment 208, and located on an opposite side of the tubular sleeve attachment segment 208 from the tubular intake segment 204. A protruding ring 212 extends radially from the central segment 210 about a circumference of the central segment 210. The protruding ring 212 divides the central segment 210, forming a shortened central segment portion 214 and a lengthened central segment portion 215. The protruding ring 212 may have opposing flat surfaces 216 on an outer radial surface of the protruding ring 212.

In one embodiment, the shortened central segment portion 214 and lengthened central segment portion 215 measure 0.347 in. (0.881 cm) and 0.69 in. (1.75 cm) along the axis 202, respectively. The diameters of the shortened central segment portion 214 and the diameter of the lengthened central segment portion 215 may be 1.3215 in. (3.355 cm). The protruding ring 212 may measure 0.584 in. (1.483 cm) along the axis 202 in one embodiment.

The deaerator shaft 102 may further comprise a tubular discharge segment 218 extending along the axis 202, forming a discharge end 219 of the deaerator shaft 102. The tubular discharge segment 218 may be adjacent to the shortened central segment portion 214. The tubular discharge segment 218 has a diameter of approximately 1.175 in. (2.984 cm), which is approximately equal to the diameter of the tubular intake segment 204.

The tubular discharge segment 218 may comprise a plurality of openings 220. The plurality of openings 220 is disposed about a circumference of the tubular discharge segment 218. The plurality of openings 220 may be spaced equally around a circumference of the tubular discharge segment 218. Each opening extends in an axial direction for approximately 0.88 in. (2.2352 cm) along the axis 202. As described in more detail below, the plurality of openings 220 can act as a primary discharge point for fluid flowing through the deaerator shaft 102. The discharge end 219 may act as a secondary discharge point for fluid, and the tubular discharge segment 218 may be chamfered at the discharge end 218.

Figure 3:
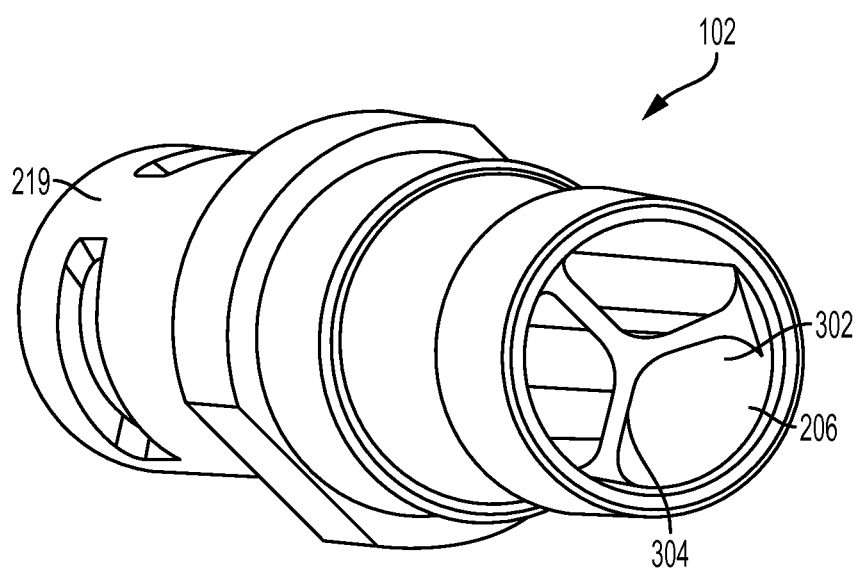
FIG. 3 is an illustration of an intake end of the deaerator shaft in accordance with one embodiment of the invention.
Figure 4:
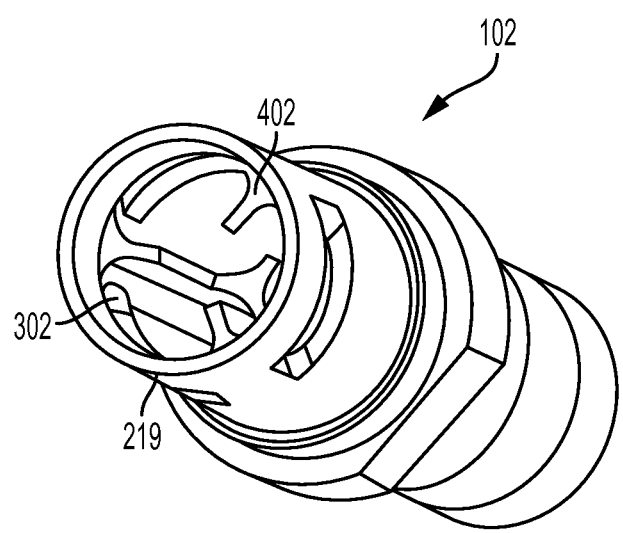
FIG. 4 is an illustration of a discharge end of the deaerator shaft in accordance with one embodiment of the invention.

FIGS. 3 and 4 illustrate a rotated view of the deaerator shaft 102. A plurality of vanes 302 may extend from a radial center of the deaerator shaft 102 to an interior wall 303 of the deaerator shaft 102. The plurality of vanes 302 may extend axially along a length of the deaerator shaft 102, forming channels within the interior of the deaerator shaft 102. The channels may assist with accelerating the fluid from longitudinal flow to rotating flow as the deaerator shaft 102 rotates, and as the fluid travels from the intake end 206 to the discharge end 219. Each channel may terminate at a respective opening of the plurality of openings 220. In one embodiment, three vanes extend from a radial center of the deaerator shaft 102, forming three channels of equal capacity. Each vane terminates at the inner wall at a point 120 degrees apart from an adjacent vane.

The plurality of vanes 302 may be axially recessed within the tubular intake segment 206 and the tubular discharge segment 219. Accordingly, the plurality of vanes 302 may not extend the entire length of the deaerator shaft 102. As shown in FIG. 3, the intake edges 304 of the plurality of vanes 302 are recessed with respect to the intake end 206 of the deaerator shaft 102. The distance from the intake edges 304 of the plurality of vanes 302 to the intake end 206 may be 0.125 in. (0.318 cm), in one embodiment.

In FIG. 4, the plurality of vanes 302 are axially recessed relative to the discharge end 219 of the deaerator shaft 102. In particular, discharge edges 402 of the plurality of vanes 302 are recessed with respect to the discharge end 219 of the deaerator shaft 102. The length of the recess between the discharge end 219 and the discharge edges 402 can vary, but in one embodiment the length of the recess is 0.376 in. (0.955 cm). Furthermore, the discharge edges 402 may be cupped, with a central part of the plurality of vanes 302 further recessed with respect to the discharge edges 402.

Figure 5:
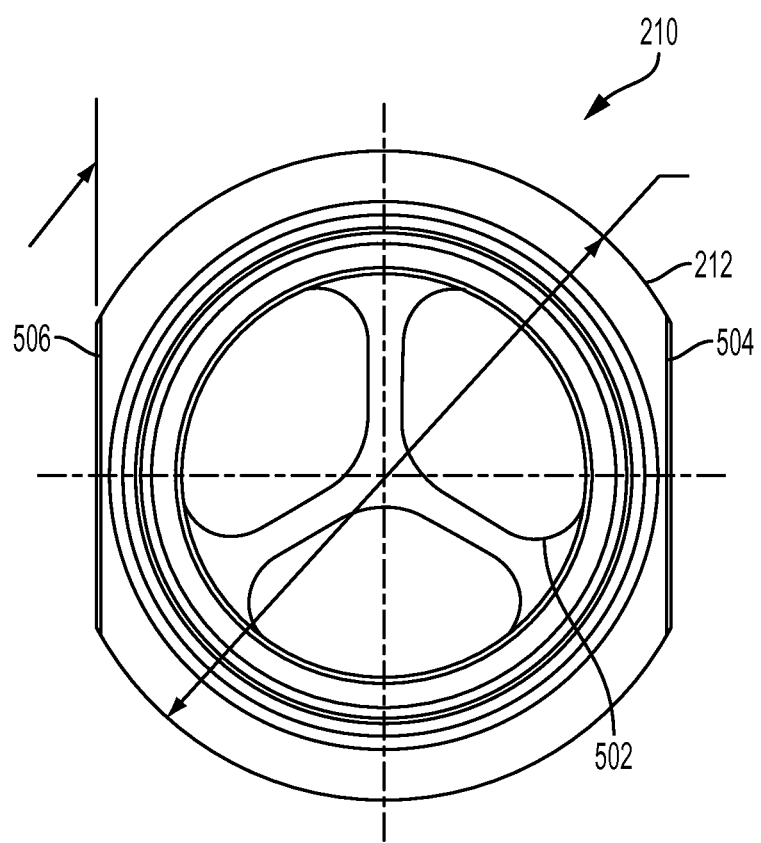
FIG. 5 illustrates a cross-sectional view of a central segment of the deaerator shaft in accordance with one embodiment of the invention.

FIG. 5 illustrates a cross-sectional view of the central segment 212. Each vane of the plurality of vanes 302 may form a rounded surface 502 with the inner radial wall of the central segment 212. The rounded surface 502 may promote ease of manufacture of the vanes. The diameter of the protruding ring 212 as measured between outer radial walls of the protruding ring 212 may be 1.562 in. (3.967 cm) in one embodiment. The distance between opposing flat surfaces 504, 506 of the protruding ring 212 may be approximately 1.374 in. (3.48 cm). The opposing flat surfaces 504, 506 may run parallel to one another.

Figure 6:
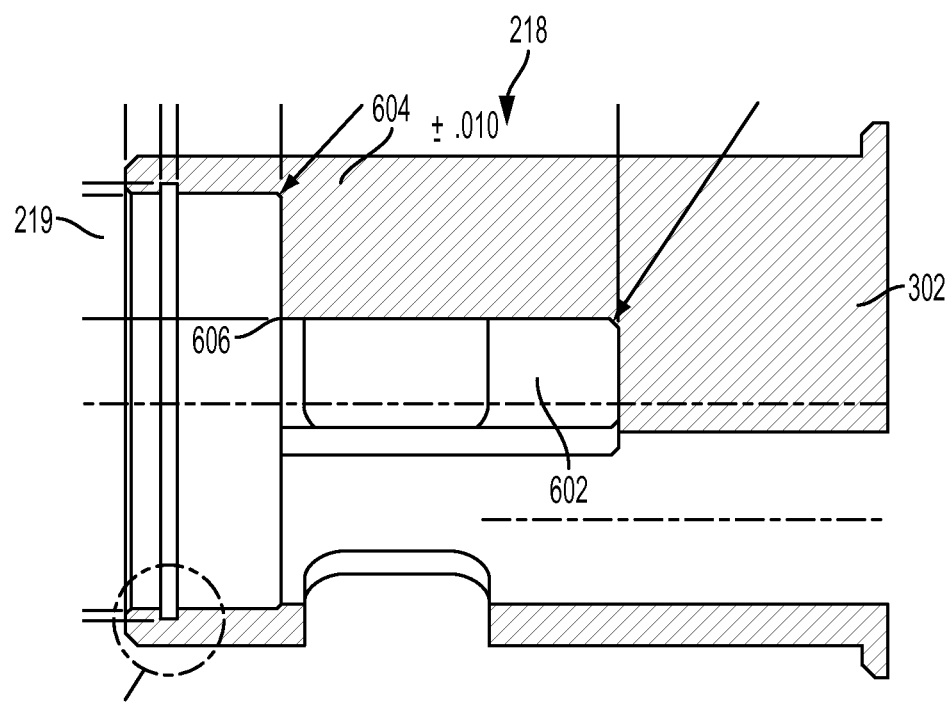
FIG. 6 illustrates a cross-sectional view of a tubular discharge segment.

FIG. 6 illustrates a cross-sectional view of the tubular discharge segment 218. The configuration of the plurality of vanes 302 extending through the tubular discharge segment 218 is illustrated in more detail. In particular, the plurality of vanes 302 is cupped, forming a central discharge opening 602 between fins 604 of the plurality of vanes 302. The central discharge opening 602 may extend 1.183 in. (3.005 cm) from the discharge end 219, and radially 0.4 in. (1.016 cm). The plurality of vanes 302 may be recessed 0.376 in. (0.955 cm) from the discharge end. Accordingly, each fin 604 of the plurality of vanes 302 may extend 0.807 in. (2.05 cm) along the axis 202. Although an edge 606 of the fin 604 is squared in FIG. 6, the edge 606 of each fin 604 may have a rounded edge.

Figure 7:
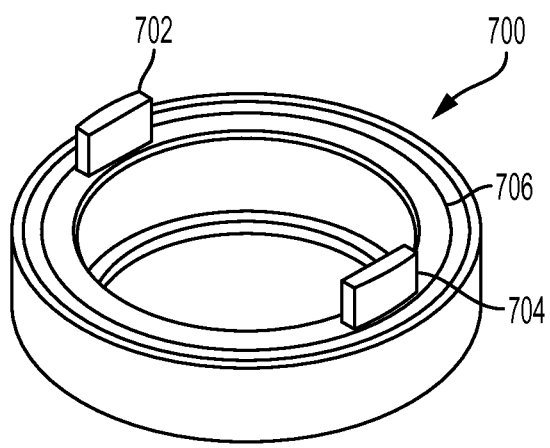
FIG. 7 is an isometric view of a gear with opposing tabs in accordance with a second embodiment of the invention.

Referring to FIG. 7 with continuing reference to FIGS. 2 and 5, an isometric view of a gear 700 is shown in accordance with the subject invention. The gear 700 is ring-shaped with opposing tabs 702, 704 that extend axially from an inner side 706 of the gear 700. As described in more detail below, the opposing tabs 702, 704 are configured to lock with the opposing flat surfaces (not shown) of the protruding ring (not shown). The opposing tabs 702, 704 are used to provide a positive transfer of torque from the gear 700 to the deaerator shaft. The gear 700 is axially mounted on protruding ring 212. The opposing tabs 702, 704 drive on opposing flat surfaces 504, 506 of the deaerator shaft, transmitting torque to the deaerator shaft.

Figure 8:
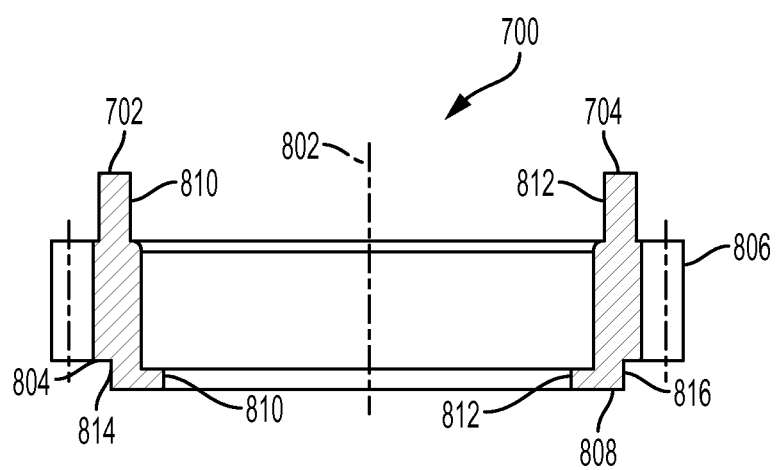
FIG. 8 illustrates a cross-sectional view of the gear in accordance with the second embodiment of the invention.

FIG. 8 illustrates a cross-sectional view of the gear 700. The gear 700 is disposed along an axis 802. The gear 700 has a central ring 804 with a diameter of approximately 1.3254 in. (3.366 cm) between inner radial walls of the central ring 804. The gear 700 has a plurality of teeth 806 circumferentially disposed about an outer radial surface of the central ring 804. The plurality of teeth 806 extend along the axial length of the central ring 804. The plurality of teeth 806 provide a thrust surface by which a mating gear (not shown) may transmit torque to gear 700. In one embodiment, the central ring 804 and the plurality of teeth 806 have an axial length of 0.35 in. (0.889 cm).

The gear 700 has a shouldered ring 808 with a diameter between inner radial surface 810 of the shouldered ring 808 of 1.195 in. (3.035 cm), and a diameter between outer radial surface 814 of the shouldered ring 808 of 1.513 in. (3.843 cm). The shouldered ring 808 may extend axially from the central ring 804 for a distance of 0.84 in. (2.133 cm). The shouldered ring 808 also provides a thrust surface when mounted to the deaerator shaft and helps to axially locate the deaerator shaft within the IDG.

The opposing tabs 702, 704 of gear 700 extend in a direction opposite to the shouldered ring 808. The opposing tabs 702, 704 may extend 0.2 in. (0.508 cm) in an axial direction.

Figure 9:
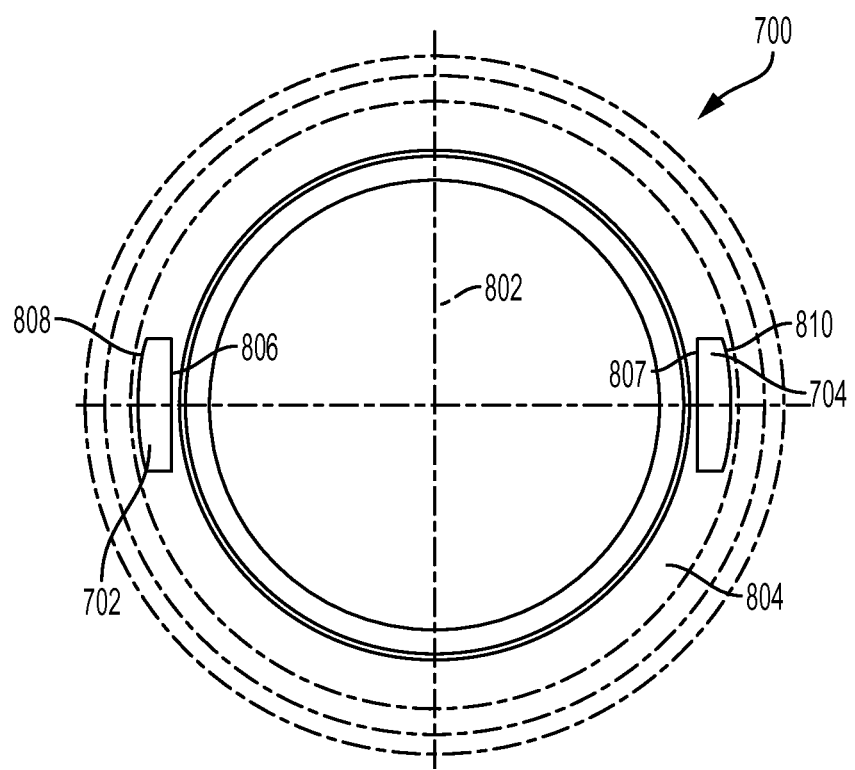
FIG. 9 illustrates an axial view of the gear in accordance with the second embodiment of the invention.

FIG. 9 illustrates an axial view of the gear 700. The opposing tabs 702, 704 have a length of 0.35 in. (0.889 cm)

extending along the cross-sectional axis 802. Radially-inward facing surfaces 806, 807 of the opposing tabs 702, 704 are flat. However, the radially-outward facing surfaces 808, 810 of the opposing tabs 702, 704 may be arced, similar to the circumference of the central ring 804.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A deaerator shaft comprising:
    a tubular intake segment that forms an intake end of the deaerator shaft, the tubular intake segment is configured to receive fluid, the intake segment having a first diameter;
    a tubular sleeve attachment segment that is adjacent to the intake segment, the tubular sleeve attachment segment having a second diameter that is greater than the first diameter;
    a tubular central segment that is adjacent to the sleeve attachment segment, the tubular central segment having a third diameter that is greater than the second diameter, the tubular central segment comprising a protruding ring that radially extends from the tubular central segment and divides the tubular central segment, the protruding ring having opposing flat surfaces and further comprising a plurality of vanes, wherein each of the plurality of vanes form a rounded surface with an inner radial wall of the central segment; and
    a tubular discharge segment that forms a discharge end of the deaerator shaft comprising a plurality of openings circumferentially disposed about a circumference of the tubular discharge segment, wherein the tubular discharge segment is adjacent to the central segment, the tubular discharge segment having a fourth diameter that is approximately equal to the first diameter.

2. The deaerator shaft of claim 1, wherein at least one corner of the plurality of openings are rounded.

3. The deaerator shaft of claim 1, wherein the plurality of vanes extend from a radial center of the deaerator shaft to the interior radial wall of the deaerator shaft.

4. The deaerator shaft of claim 3, wherein the plurality of vanes form the rounded surface with the inner radial wall of the central segment and are axially recessed within the tubular intake segment.

5. The deaerator shaft of claim 4, wherein the plurality of vanes are recessed within the tubular intake segment and the tubular discharge segment.

6. The deaerator shaft of claim 5, wherein the plurality of vanes extend axially between the plurality of openings.

7. The deaerator shaft of claim 6, wherein a central divider of the plurality of vanes is removed within the tubular discharge segment.

8. The deaerator shaft of claim 1, wherein the tubular intake segment has a diameter of approximately 1.175 in. (2.9845 cm).

9. The deaerator shaft of claim 1, wherein the protruding ring axially extends approximately 0.584 in. (1.483 cm).

* * * * *